United States Patent [19]
Margolis et al.

[11] Patent Number: 5,441,261
[45] Date of Patent: Aug. 15, 1995

[54] MAGNETIC GLOBE PUZZLE HAVING PLURAL PUZZLE LAYERS AND GLOBE STAND THEREFOR

[76] Inventors: Susan Margolis; Scott H. DeYoung, both of P.O. Box 838, Ridgefield, Conn. 06877

[21] Appl. No.: 636,447

[22] Filed: Dec. 31, 1990

[51] Int. Cl.[6] .............................................. G09B 27/08
[52] U.S. Cl. ................... 273/157 R; 273/239; 434/134; 434/147
[58] Field of Search ............... 273/153 R, 156, 157 R, 273/239; 434/130, 131, 134, 135, 150, 147; 446/901

[56] References Cited

U.S. PATENT DOCUMENTS

| | | | |
|---|---|---|---|
| 1,523,188 | 1/1925 | Flood | 434/147 |
| 1,739,861 | 12/1929 | Roberts | 273/157 R |
| 2,674,813 | 4/1954 | Hutchinson | 273/156 |
| 3,851,884 | 12/1974 | Myller | 273/157 R |
| 4,115,930 | 9/1978 | Beck | 434/131 |
| 4,494,935 | 1/1985 | Miller | 273/157 R |
| 4,595,367 | 6/1986 | Forsyth | 434/147 |
| 4,937,181 | 6/1990 | Rogers | 434/150 |
| 5,080,591 | 1/1992 | Forsyth | 434/147 |

FOREIGN PATENT DOCUMENTS

| | | | |
|---|---|---|---|
| 0852466 | 11/1952 | Germany | 434/134 |
| 2235805 | 3/1991 | United Kingdom | 434/147 |

*Primary Examiner*—Vincent Millin
*Assistant Examiner*—William M. Pierce
*Attorney, Agent, or Firm*—F. Eugene Davis, IV

[57] ABSTRACT

The globe is rotationally molded of iron particles and a plastisol of polyvinyl chloride and has embossed therein, from the mold, lines of longitude and latitude. Two or more layers of magnetized puzzle pieces are formed by printing their indicia on flat, soft, magnetized thermo plastic sheets and then die cut. The indicia is printed such that, when necessary, successive layers of puzzle pieces have their magnets aligned so that specific pieces adhere to specific places on pieces of adjacent layers. When necessary, the pieces are heat formed to conform to the globe shape. Preferably, the first layer contains continental and longitude and latitude information; the second layer, geologic features; and the third layer, political information. The globe stand has a recess therein, the bottom of which is of the same curvature as the globe and may incorporate or have sprayed on iron containing material so that the puzzle pieces may be conveniently stored there when not applied to the globe.

23 Claims, 13 Drawing Sheets

MAGNETIC GLOBE PUZZLE HAVING PLURAL PUZZLE LAYERS AND GLOBE STAND THEREFOR

TECHNICAL FIELD

This application relates to magnetic globe puzzles having plural puzzle layers, to methods of making the globe and the puzzle layers, and to a stand for the globe. The application also relates to the formation of solid plastic material to which sheet magnets may be adhered.

BACKGROUND ART

Magnetic globe puzzles are known in the prior art. For example, U.S. Pat. No. 3,618,955 discloses an earth puzzle including a sphere formed of magnetizable material and a plurality of puzzle pieces which may be placed on the sphere to form a world globe. The puzzle pieces are retained on the sphere by permanent magnets attached to the underside of the puzzle pieces. In making the aforementioned structure, the sphere is first fabricated from magnetizable material, preferably from molded plastic containing magnetizable iron or other particles. A second sphere is molded on the first sphere, after which a representation of the world is painted or otherwise placed on the second sphere. The second sphere is then cut into puzzle pieces and removed from the first sphere. Permanent magnets are then suitably attached to the underside of the puzzle pieces which may then be placed on the first sphere to form a world globe with the permanent magnets retaining the pieces on the first sphere. Alternatively, the sphere may be formed of magnets and the pieces incorporate magnetizable material.

U.S. Pat. Nos. 3,865,382 and 3,851,884 describe a similar puzzle where the puzzle pieces are permanently magnetized on one side thereof by a coating having magnetic poles in the form of stripes.

Other forms of globe jigsaw puzzles are found in the prior art but, as far as is known to applicants, none of these employ plural layers of pieces having related geographic information thereon nor does the substrate layer bear informational indicia.

DISCLOSURE OF THE INVENTION

The invention comprises a hollow globe rotationally molded of polyvinyl chloride plastisol and iron powder having molded therein embossed lines of latitude and longitude and other information as desired. The rest of the geographic information of the globe is embodied in several layers of puzzle-like pieces of soft, flexible magnetized thermoplastic material. The first layer may be cut into continental or large country areas and also have lines of latitude and longitude printed thereon to conform to the lines of latitude and longitude printed on the globe, for initial placement purposes. The second layer may have geologic information, such as rivers, valleys, and mountains; and the third layer political information, such as countries, counties, cities, etc. Further layers may be employed, such as labels of continental areas, etc. The puzzle pieces are preferably initially printed on flat stock of sheet thermoplastic material incorporating linearly magnetized portions therein and the successive layers are aligned, such that when the layers are placed in the proper position on top of each other, the North and South poles of the magnets in the successive layers will be opposite each other, and the layers will adhere together in proper registration.

After printing, wherein the indicia are slightly distorted due to the flat nature of the magnetic thermoplastic stock on which the indicia are printed, the pieces are cut and then, when necessary, heat formed into the same curvature as the globe.

The globe is provided with a base having a hollowed out portion therein for retaining the pieces when they are not applied to the globe. The bottom, of the hollowed out portion, is preferably formed in the same curvature as the globe so that the pieces may lie in their undistorted curved form. The bottom may be formed of iron containing material, for example; the same material as the globe itself so that the pieces will be magnetically retained. Alternatively, the bottom may be thermoformed and sprayed with an iron containing coating, if desired.

OBJECTS OF THE INVENTION

It is therefore an object of the invention to provide a globe puzzle having plural puzzle layers.

Another object of the invention is to provide a method of manufacturing a globe to which magnetized pieces may be attached.

A further object of the invention is to provide a method for making puzzle layers for a globe from flat sheet material.

Still another object of the invention is to provide a globe stand for a globe puzzle having means for retaining unused puzzle pieces therein.

The invention accordingly comprises several steps and the relation of one or more such steps with respect to each of the others, and articles possessing features, properties, and relation of elements which are exemplified in the following detailed disclosure.

Other objects of the invention will in part be obvious and will in part appear hereinafter.

The scope of the invention will be indicated in the claims.

BRIEF DESCRIPTION OF THE DRAWINGS

For a fuller understanding of the nature and objects of the invention, reference should be had to the following detailed description, taken in connection with the accompanying drawings, in which.

The same reference characters refer to the same elements throughout the several views of the drawings.

BEST MODE FOR CARRYING OUT THE INVENTION

Figure 1:
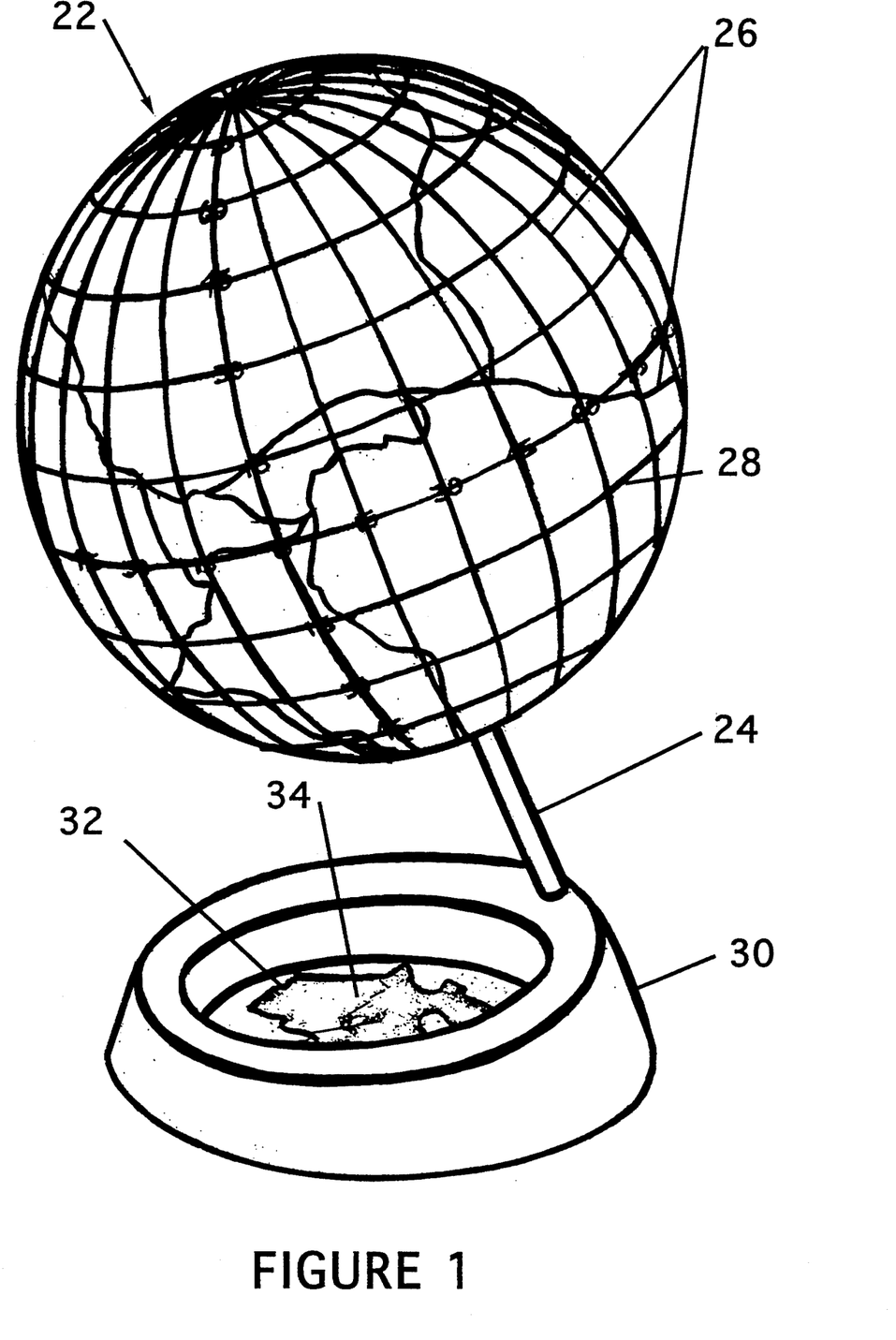
FIG. 1 is a perspective view of a globe and stand according to our invention showing the puzzle pieces stored in the base.

Now referring to FIG. 1, our magnetic globe puzzle and stand is generally indicated at 20. It comprises a hollow globe 22 formed of plastic material having iron powder or other ferromagnetic material therein, a support rod 24 forming the axis of the globe 22 around which it may rotate, and a base 30. Lines of longitude 26 and latitude 28 are preferably embossed in the globe 22. Other information, such as numbers, plate outlines, islands and the like may also be embossed on the globe 30 surface. The base 30 contains a recess, or well, generally indicated at 32, in which the puzzle pieces 34 are stored. The bottom of the recess 32 is curved the same as the globe 22.

Figure 2:
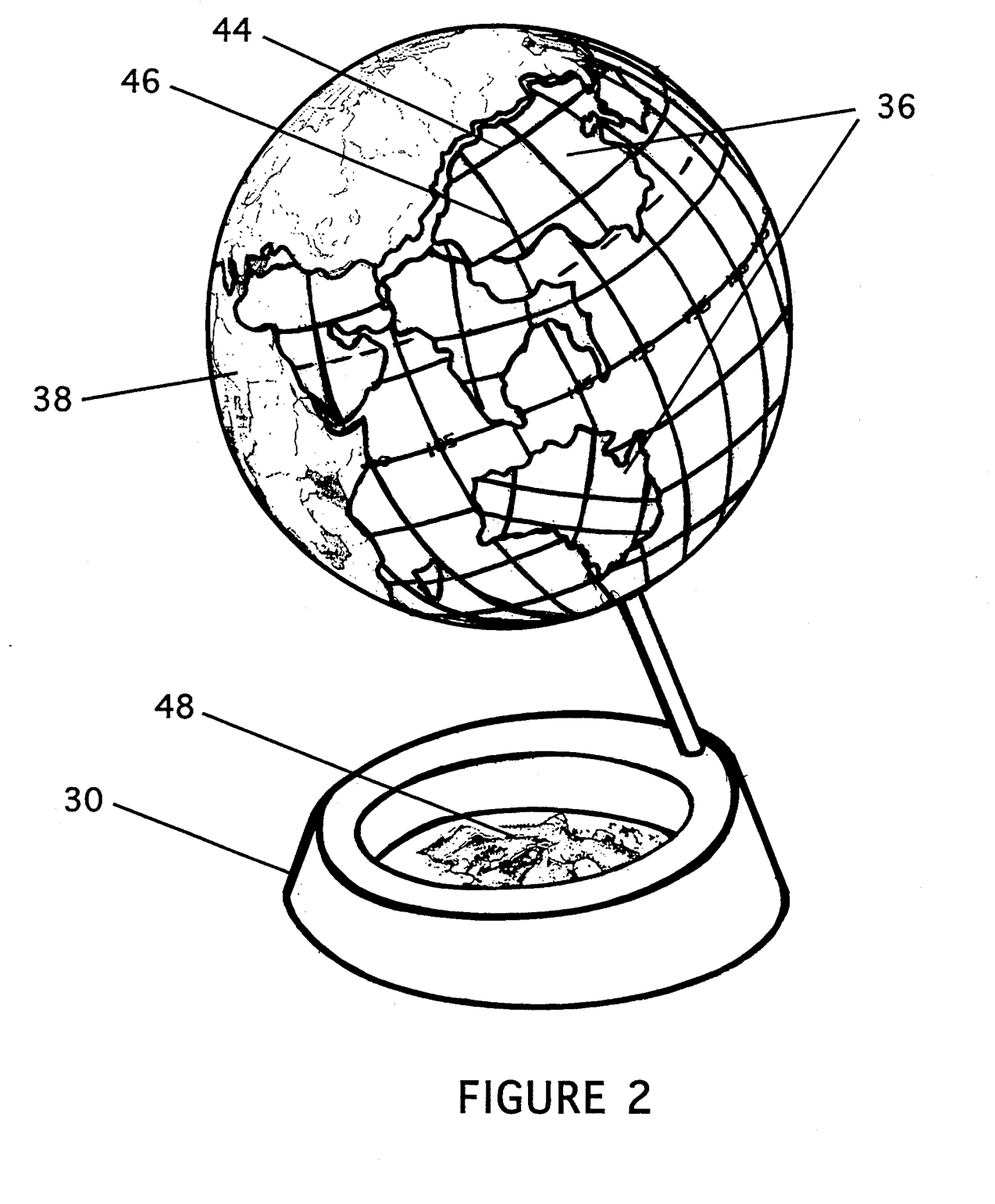
FIG. 2 is a perspective view similar to FIG. 1 showing our globe puzzle with the first layer of pieces applied.

In FIG. 2, the first layer pieces 36 have been applied to the globe. They are, preferably, formed of magnetized flexible thermoplastic sheet material and are preferably formed as continents, such as Africa 38 or large continental countries, such as Canada 40 and the U.S. 42. Preferably, pieces 36 have lines of latitude 44 and longitude 46 printed thereon. These help place the piece correctly on the globe by aligning the lines of the pieces with the lines embossed in the globe. In FIG. 2, the second layer of puzzle pieces 48 can be seen stored in the base 30.

Figure 3:
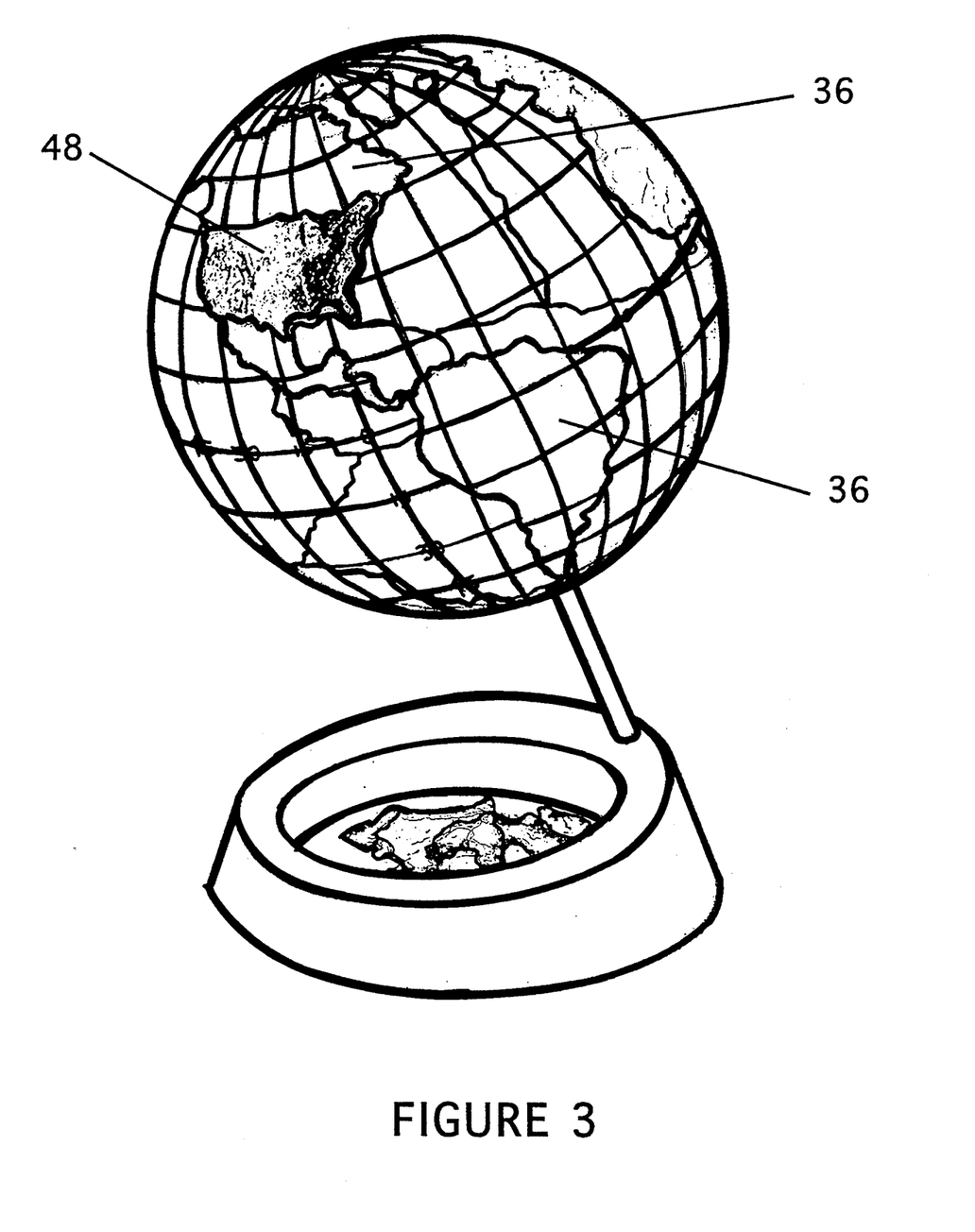
FIG. 3 is a perspective view similar to FIG. 1 of our globe puzzle showing some of the second layer pieces applied.

In FIG. 3, some of the second layer pieces have been applied over the continental first layer pieces 36. The pieces 48 have geologic indicia of mountains, valleys, rivers, and the like.

Figure 4:
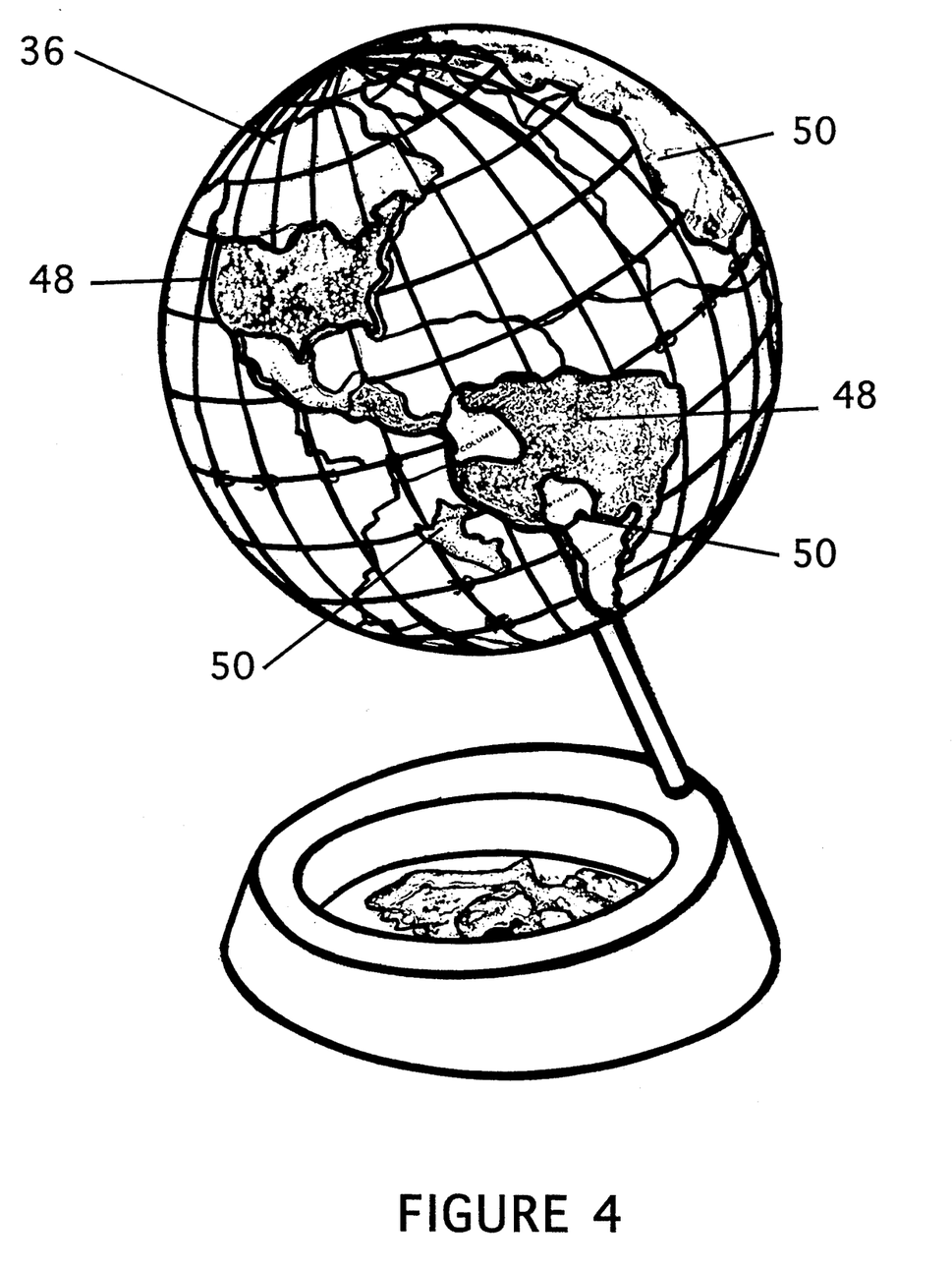
FIG. 4 is a perspective view similar to FIG. 1 of our globe puzzle showing all of the second layer and some of the third layer pieces applied.

Now referring to FIG. 4, it can be seen that the remaining second layer geologic containing information pieces 48 have been applied and some of the third layer of pieces bearing indicia of political information have been applied. The political information can be political subdivision, cities, and the like.

Figure 5:
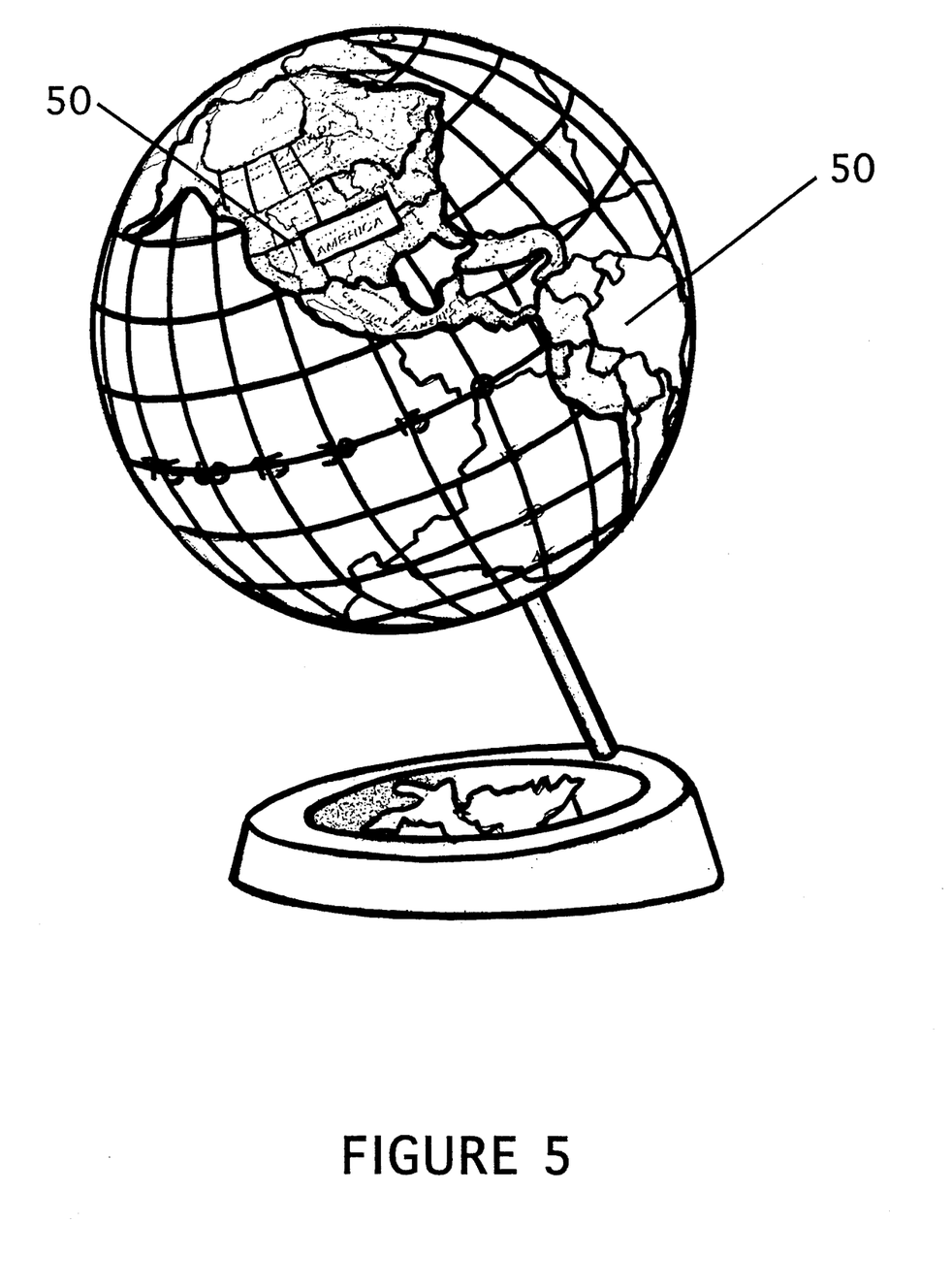
FIG. 5 is a perspective view similar to FIG. 1 of our globe puzzle with all of the third layer pieces applied.

In FIG. 5, all of the third layer of political information bearing pieces 50, such as North and South America have been applied.

Figure 6:
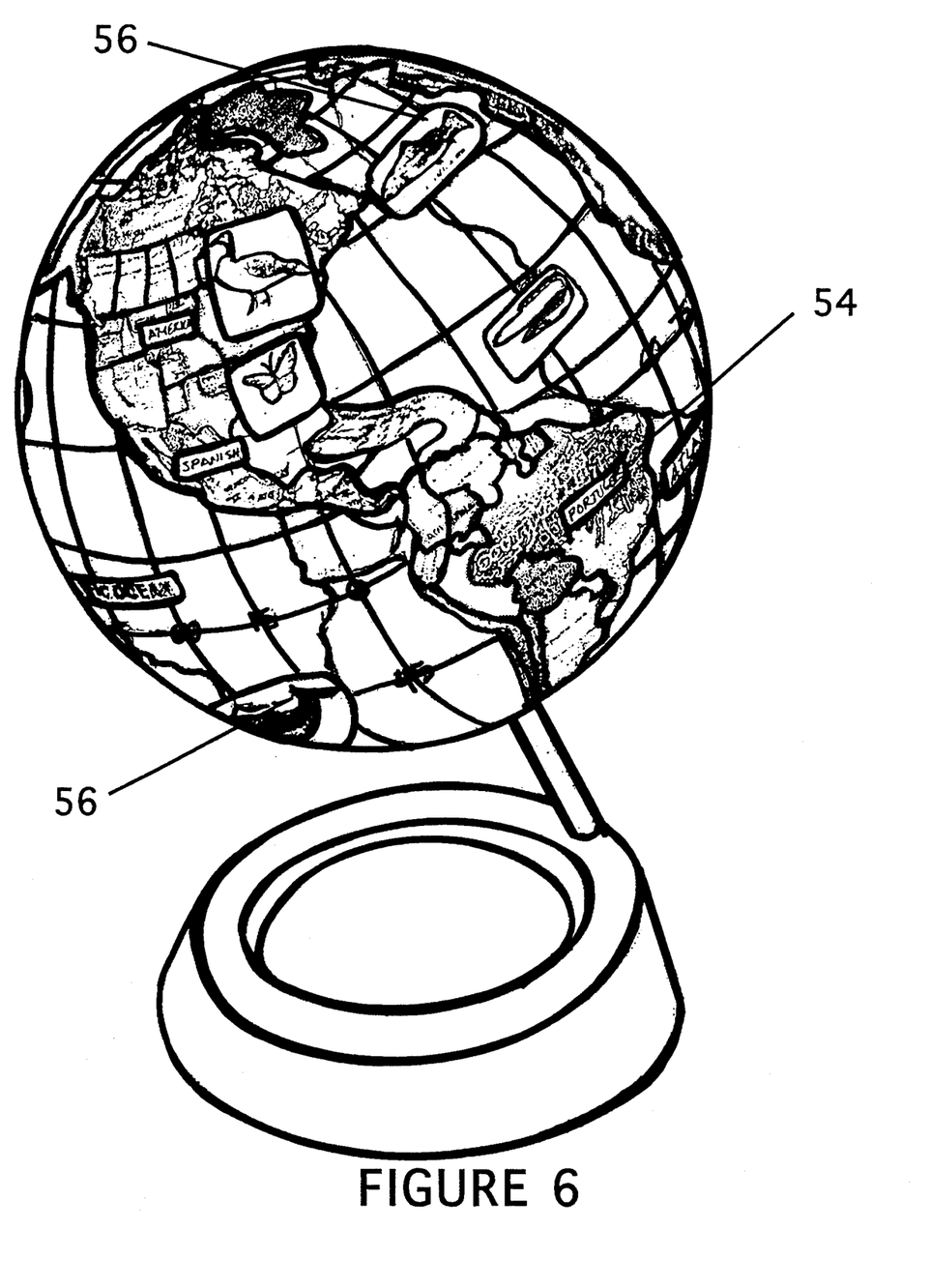
FIG. 6 is a perspective view similar to FIG. 5 with a fourth layer of pieces applied.

As seen in FIG. 6, a fourth layer of pieces 54 and 56 may be applied. These may contain such information as the language spoken (pieces 54) and the fauna or flora found (pieces 56).

Figure 7:
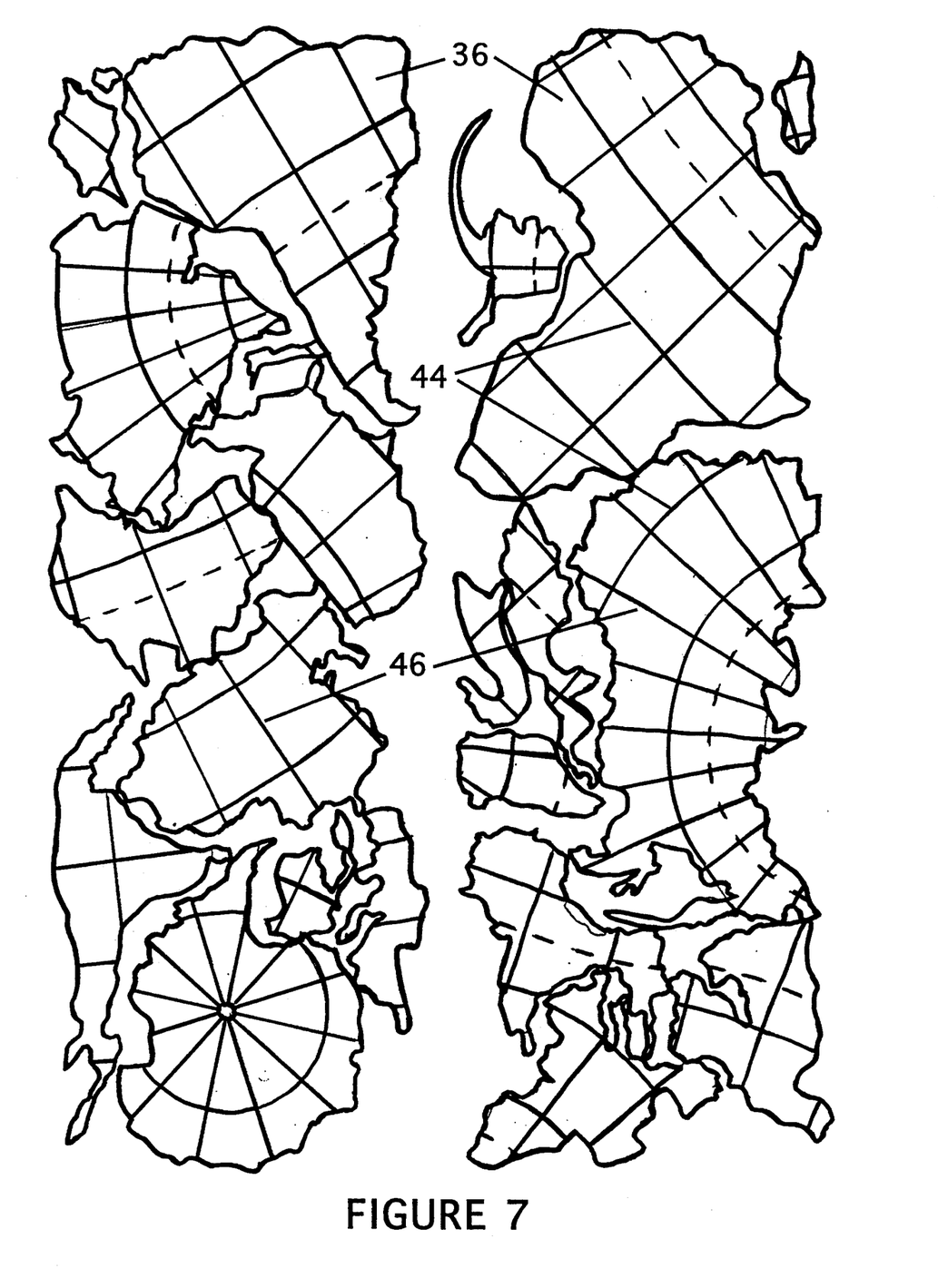
FIG. 7 is a diagram showing how the first layer of pieces may be printed with longitude and latitude indicia on a single sheet of magnetic material.

FIG. 7 illustrates the indicia printed on the first layer pieces 36; namely: the lines of latitude 44 and longitude 46.

Figure 8:
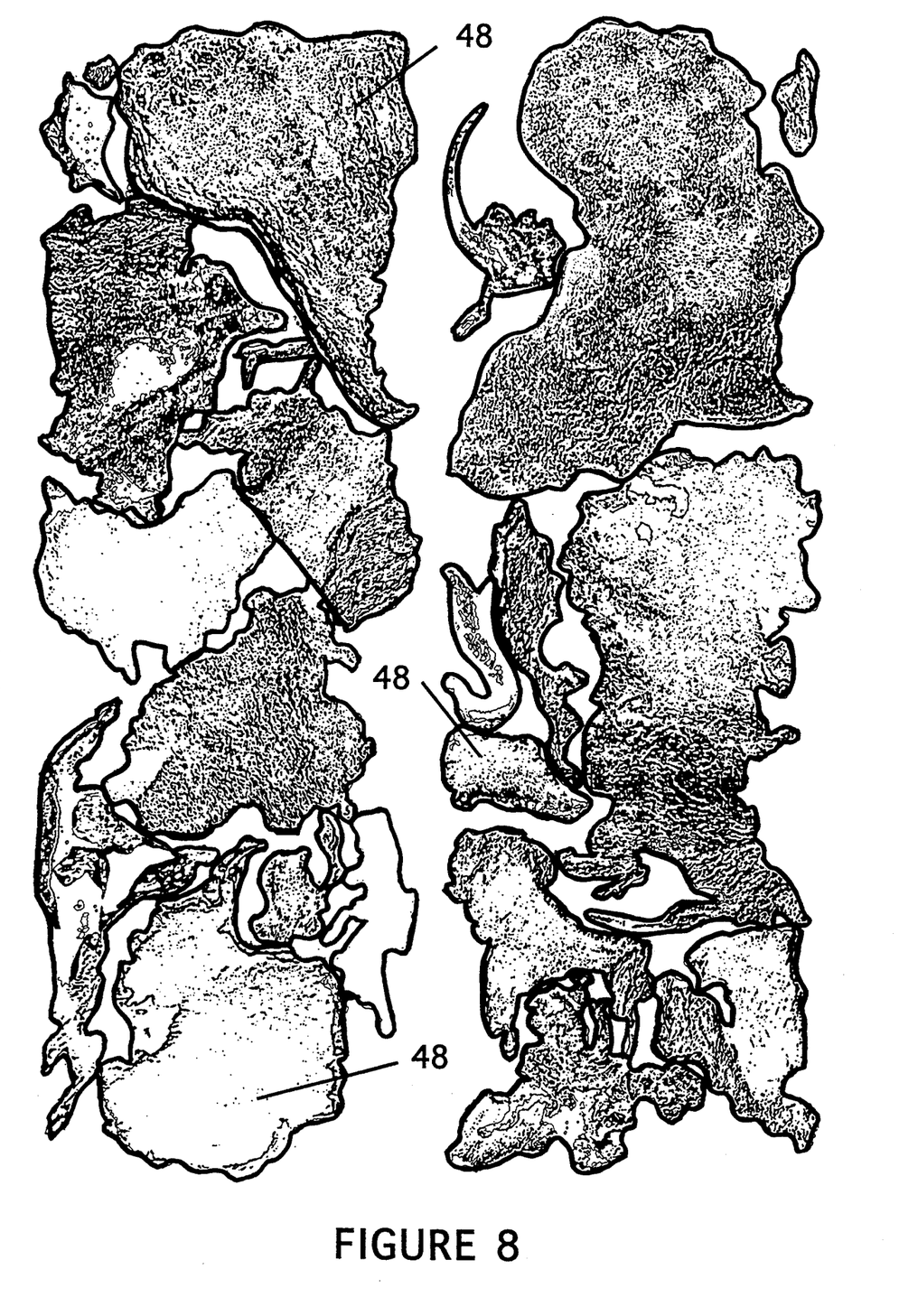
FIG. 8 is a view similar to FIG. 7 showing how a second layer may be printed with indicia of geologic information on a single sheet of magnetic material.

FIG. 8 shows the geologic information showing mountains and valleys; rivers and streams, etc. which may be printed on the pieces 48 of the second layer.

Figure 9:
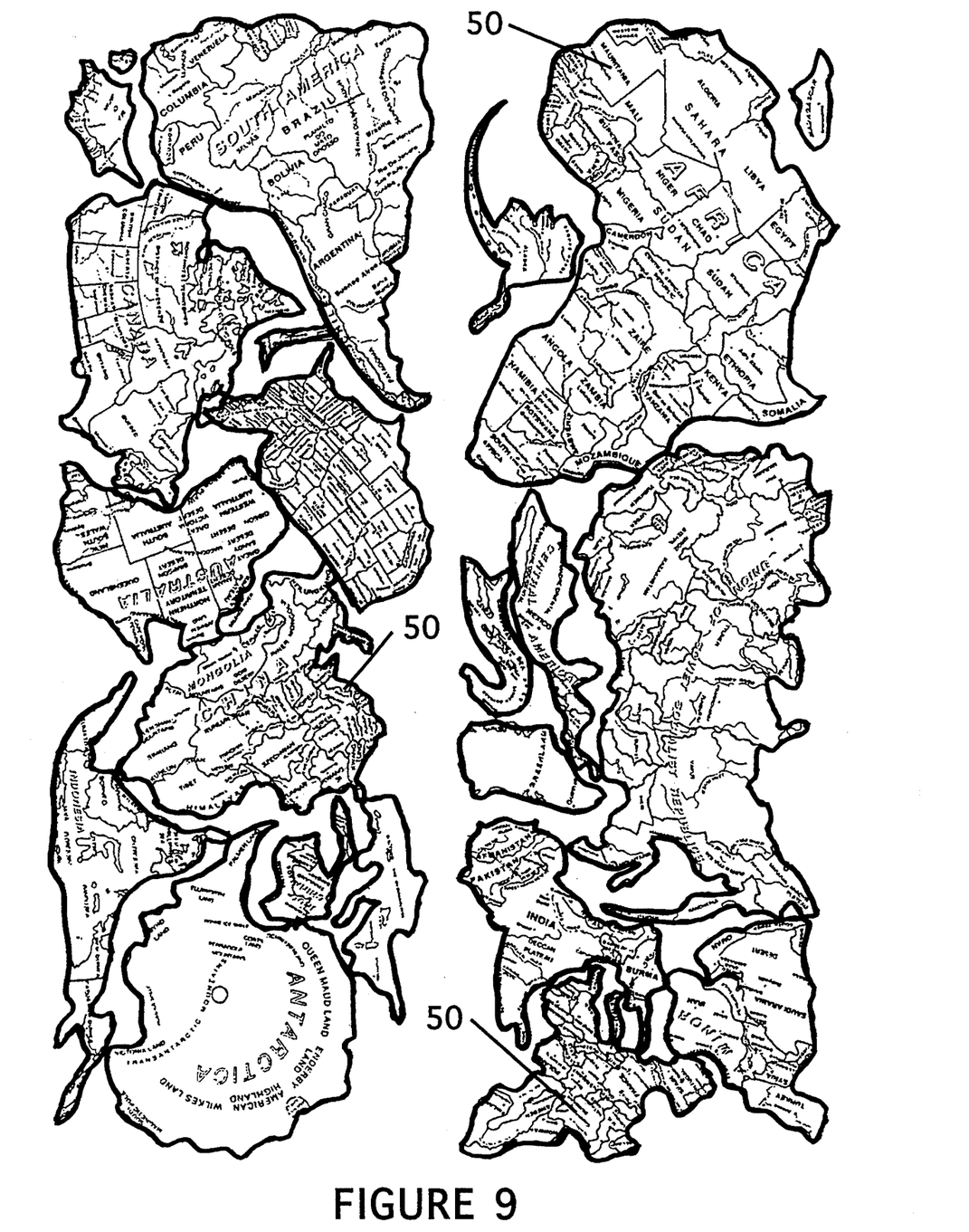
FIG. 9 is a view similar to FIG. 7 showing how a third layer may be printed with indicia of political information on a single sheet of magnetic material.

FIG. 9 shows the indicia of political information that may be printed on the pieces 50 of the third layer.

Figure 10:
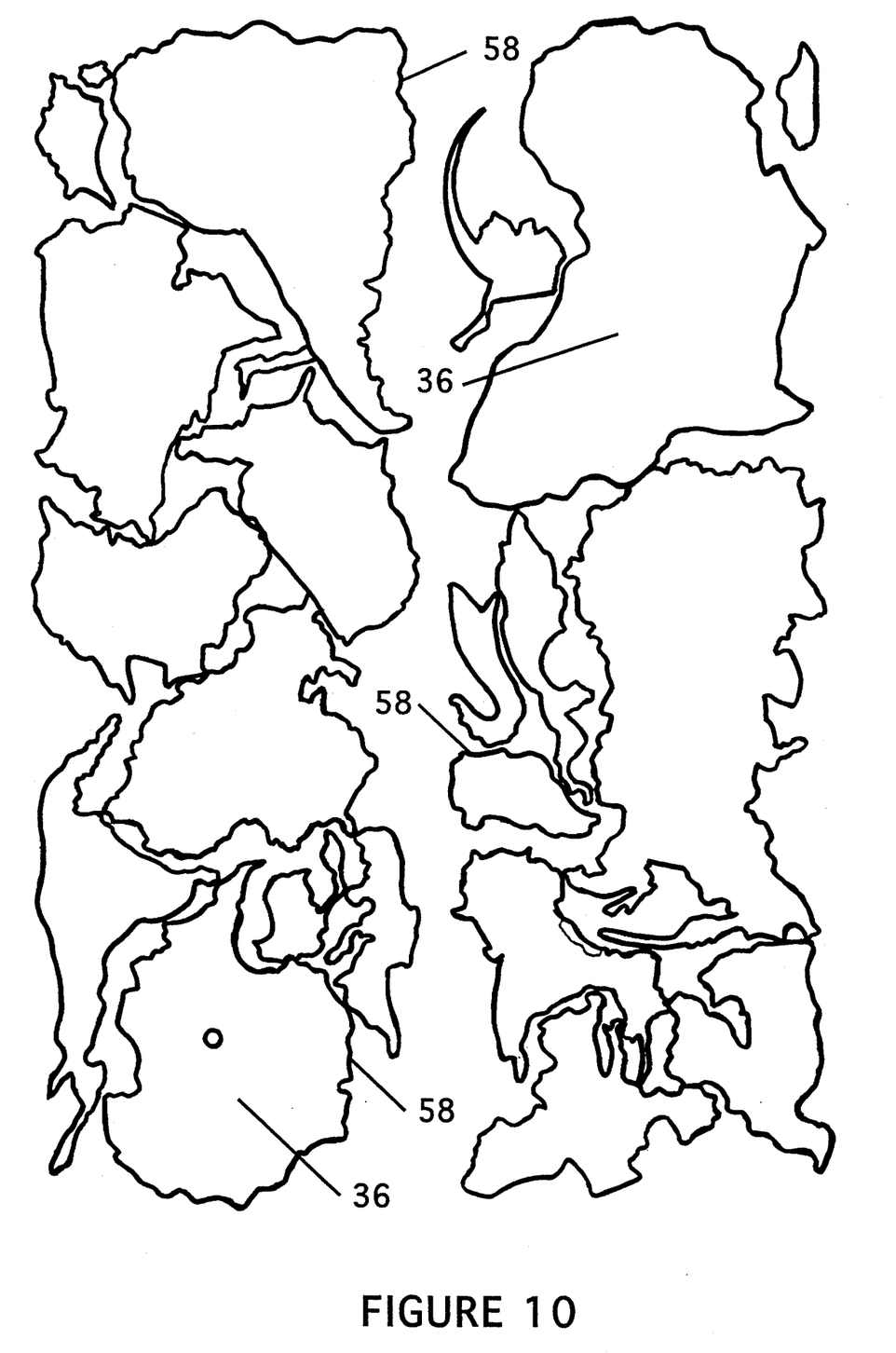
FIG. 10 is a diagram showing the die cuts used to cut out the continental pieces shown in FIG. 7 and may also be employed to cut out the geologic pieces of FIG. 8.

FIG. 10 shows die cuts 58 for cutting out the pieces 36 of the first layer.

The same die cuts 58 may be applied to form the second layer piece 48; however, additional die cuts or altogether different die cuts could be employed so that the second layer pieces would be smaller than the first layer pieces.

Figure 11:
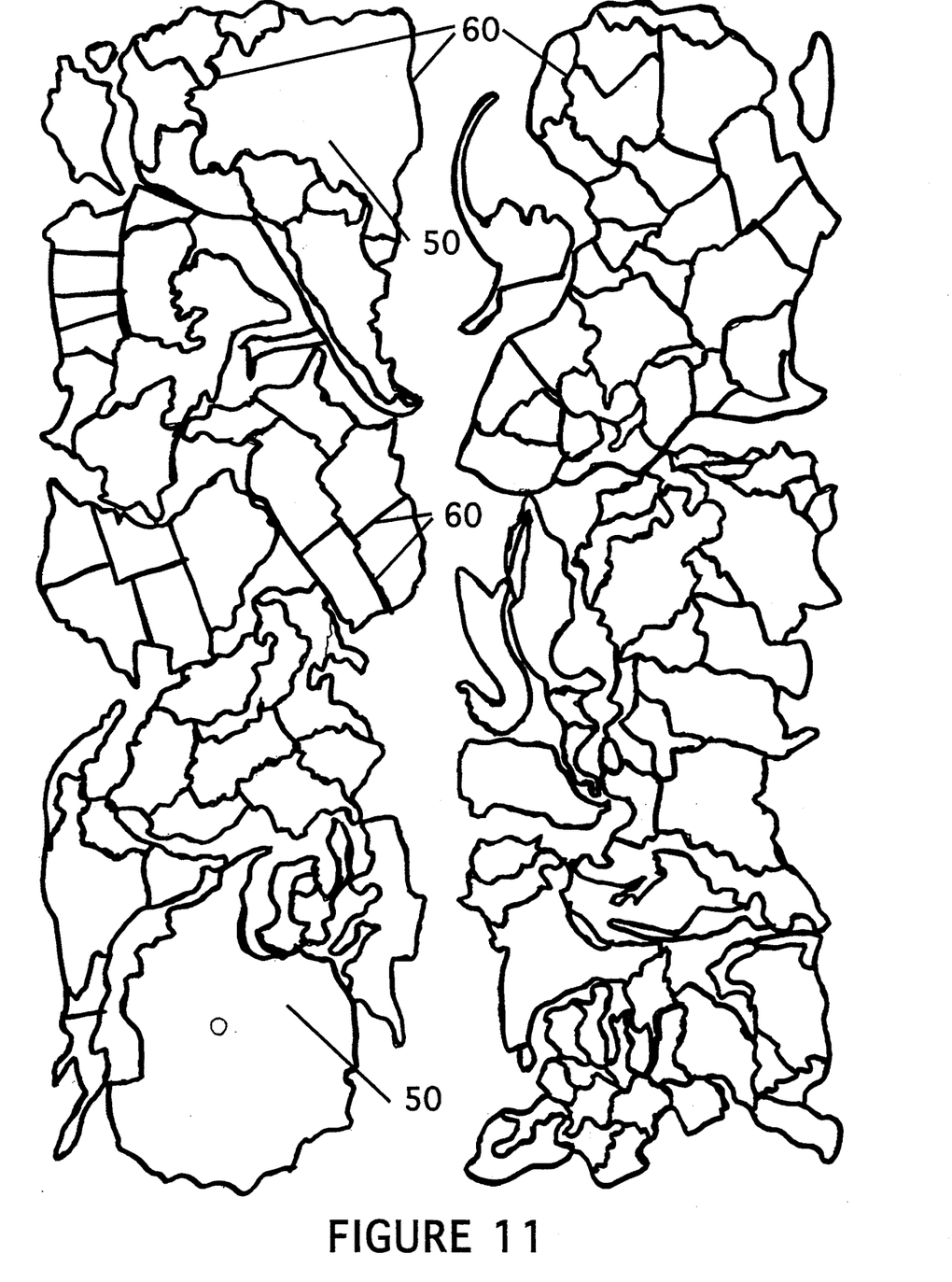
FIG. 11 is a diagram similar to FIG. 10 of the die cuts used to cut out the pieces of the political layer shown in FIG. 9.

FIG. 11 illustrates the die cuts utilized to cut the art work of FIG. 9 into the third layer political pieces 50, the die cut lines being shown at 60 such that the third layer pieces are smaller than the first and second layer pieces.

Figure 14:
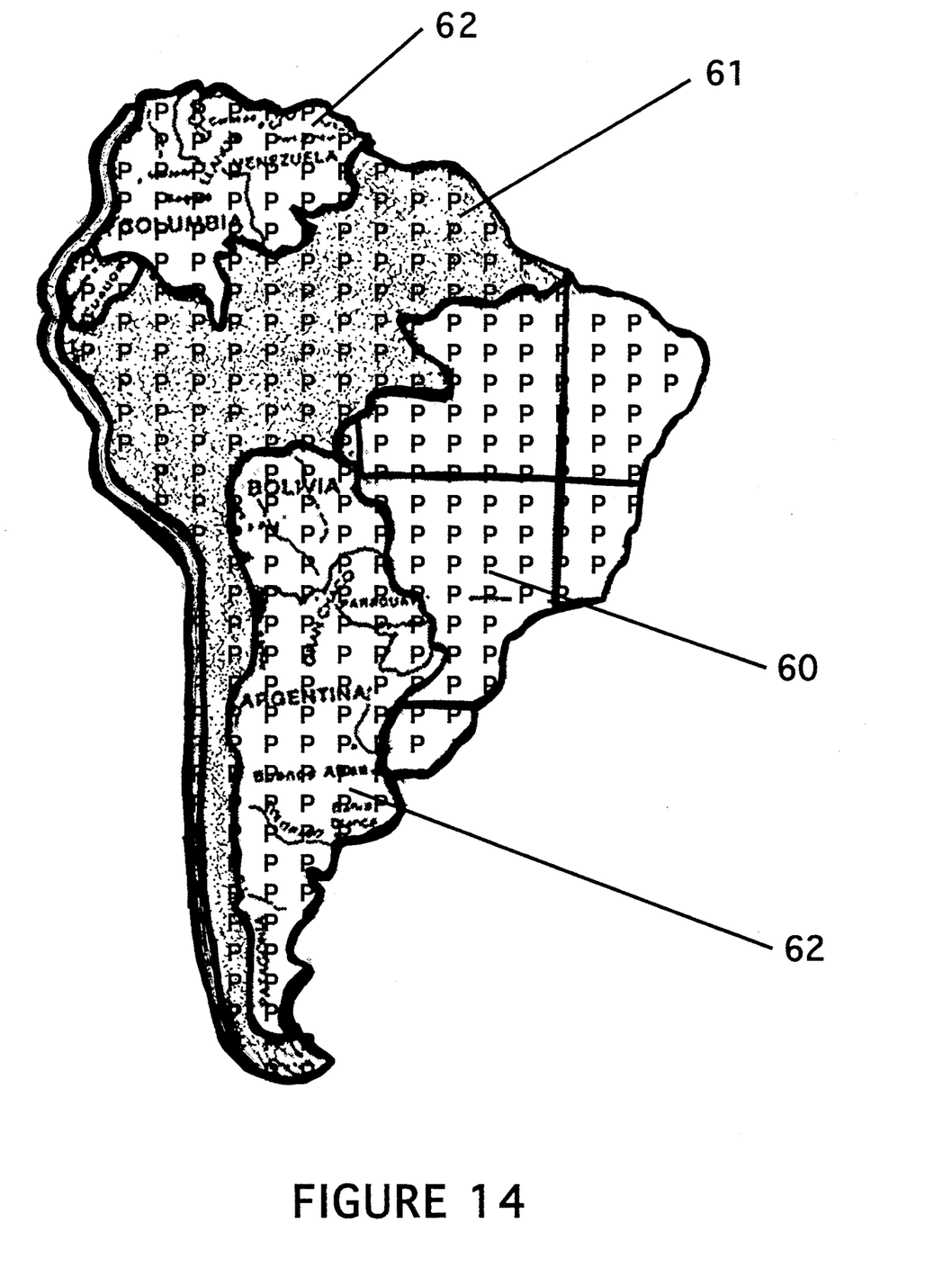
FIG. 14 is a diagrammatic view showing how the rows of poles in successive layers of puzzle pieces are aligned.

FIG. 14 illustrates how a large piece 60 of an underlayer has its poles (represented by "P") aligned linearly and 2 smaller pieces 61 and 62 fit over piece 60 in predetermined positions with their poles aligned.

The globe 22 is preferably rotationally molded from a plastisol comprising a colloidal suspension of polyvinyl chloride and a plasticizer having iron powder mixed therein sufficient to allow the magnetic puzzle pieces 34 to adhere to the globe 22. The iron powder may be Ancorsteel 1000 TM obtained from Hoeganaes Corporation, Riverton, N.J. The iron powder preferably comprises more than 10% by volume and more than 40% by weight of the final globe 22 as this is the amount that appears to be required to cause the magnets to adhere to it. The preferred ratio that we have found is approximately 15% iron powder by volume which amounts to about 50% by weight of the globe 22. Other forms of iron may be used such as carbonyl spherical particles, however; when this form of iron is used, it is difficult to color the final product and the price of the material is rather high.

The three layers shown in FIGS. 7, 8, and 9 of puzzle pieces 38, 48, and 50 are preferably printed as shown in those Figures directly onto sheets of flexible thermoplastic material containing magnets. The layer material available usually comprises magnets aligned in linear parallel rows and the indicia of the successive layers must be offset from the lines of poles, such that the poles in the successive layers are properly aligned to adhere to one another and obtain proper registration of the successive layers of pieces. The indicia shown in FIGS. 7, 8, and 9 have been distorted, such that when each piece is cut out and then heat shaped to conform to the curvature of the globe 22, boundaries and other indicia printed thereon will be accurate on the globe.

Figure 12:
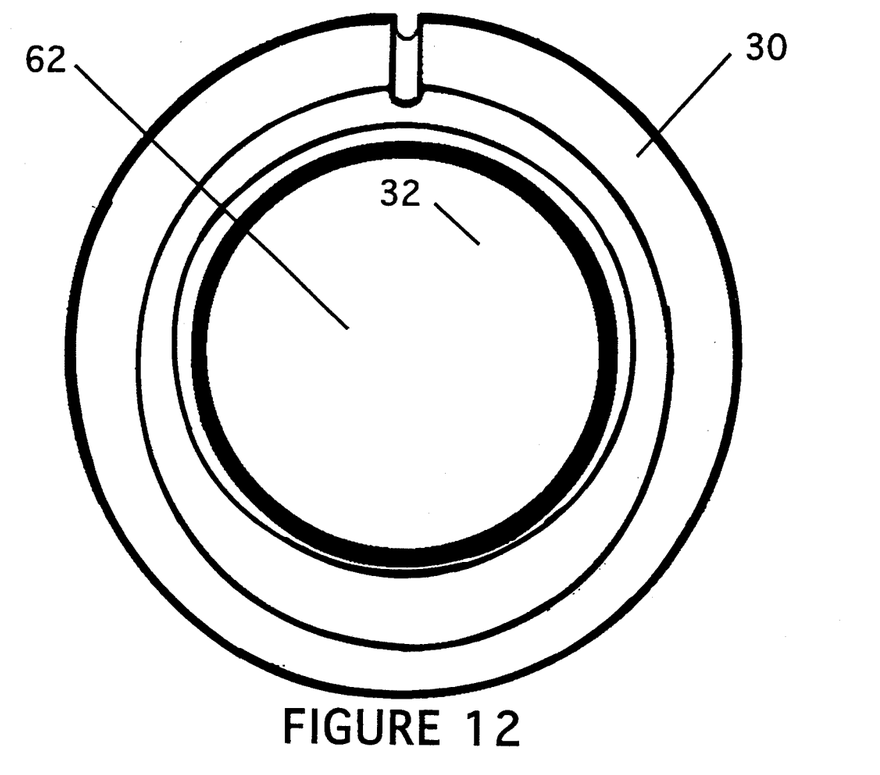
FIG. 12 is a top view of the base of the stand shown in FIG. 1.
Figure 13:
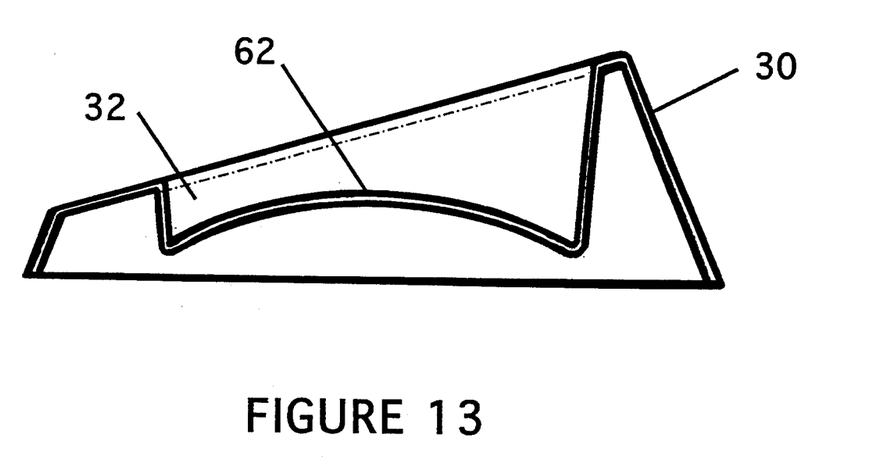
FIG. 13 is a cross sectional view taken along the line 13—13 of FIG. 12.

FIGS. 12 and 13 illustrate the base 30 and the recess 32 formed therein. The bottom 62, of which, is curved the same as the globe 22 so that the puzzle pieces will lay therein without distortion. The base 30 may be formed of the same plastic material incorporating iron powder as the globe 22 so that the pieces will adhere to the bottom 62 by magnetic attraction. However, the base is preferably thermaformed. If desired, it may be sprayed with a plastisol and iron powder to retain the pieces.

It will be understood that although we have disclosed a globe with plural layers of magnetic pieces adhered thereto, our invention contemplates portions of globes being utilized as the substrate for the plural layer pieces and other means, such as electrostatic attraction, may be used for holding the several layers together and to the substrate. Furthermore, it is contemplated that these various pieces and substrate may be flat in the form of flat multilayer puzzles or maps. Other shapes such as a human or animal form may be employed as the substrate and the pieces may show successive layers of anatomy, for example.

Those skilled in the art will understand that other material may be utilized to incorporate the iron powder in the substrate and that the substrate itself may incorporate magnets; the first layer of puzzle pieces then employing iron material; and the second layer again, magnets; the next layer incorporating iron particles and so forth through its successive layers, it merely being contemplated that the layers be held together magnetically.

It will thus be seen that the objects set forth above, among those made apparent from the preceding description, are efficiently attained and, since certain changes may be made in carrying out the above methods and in the articles set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is understood that in said claims, ingredients, or compounds recited in the singular are intended to include compatible mixtures of such ingredients where ever the sense permits.

By globe, we mean rounded or ball shaped, however; other complex curve shapes might be employed as a substrate for puzzle according to our invention.

Having described our invention, what we claim as new and desire to secure by Letters Patent is:

1. A puzzle comprising:
   A. a substantially continuous substrate comprising ferromagnetic material;
   B. a first layer of first puzzle pieces incorporating magnets having poles oriented in lines in said first layer and said first puzzle pieces bearing informational indicia of a first kind adapted to be magnetically affixed to said substrate and providing a smooth surface away from said substrate; and
   C. a second layer of second puzzle pieces incorporating magnets having poles oriented in lines in said second layer and each said second puzzle piece bearing informational indicia of a second kind functionally related to said first kind and each said second puzzle piece adapted to be magnetically affixed over said first layer and to fit over a specific portion of said first layer pieces to which it is specifically functionally related with the poles of said second layer aligned over the poles of said first layer to facilitate such fit and wherein said magnets are aligned with the north and south poles of the magnets in said layers opposite to each other.

2. A puzzle as defined in claim 1, wherein the surface of said second layer away from said substrate is smooth, and:
   D. a third layer of third puzzle pieces incorporating magnets having poles oriented in lines in said layer and said third puzzle pieces bearing informational indicia of a third kind functionally related to said first and second kind and adapted to be magnetically affixed over said second layer and each said third layer piece adapted to fit over a specific portion of said second layer pieces to which it is specifically functionally related with the poles of said additional layer being aligned over the poles of the first layer to facilitate such fit.

3. A puzzle as defined in claim 2 wherein the pieces of one of said layers are smaller than the pieces of one of said layers over which they are affixed.

4. A puzzle as defined in claim 1 wherein the pieces of said second layer are smaller than the pieces of said first layer over which they are affixed.

5. A puzzle as defined in claim 4 wherein said pieces bear map indicia.

6. A puzzle as defined in claim 5 wherein said substrate has a globe shaped surface.

7. A puzzle as defined in claim 1 wherein said pieces bear map indicia.

8. A puzzle as defined in claim 7 wherein said substrate has a globe shaped surface.

9. A puzzle as defined in claim 1 wherein said substrate comprises iron powder in a plastic matrix.

10. The puzzle defined in claim 9 wherein said plastic is polyvinyl chloride.

11. The puzzle defined in claim 9 wherein said substrate is a hollow globe.

12. The puzzle defined in claim 1 wherein said substrate bears indicia of longitude and latitude; and one of said first or second layer pieces bear indicia of geologic features, and the other layer pieces bear indicia of political information.

13. A puzzle as defined in claim 1 wherein said substrate is a globe, said pieces are curved and:
    a base for said globe comprising a hollowed out portion comprising a bottom, said bottom having the same curvature as said globe and adapted to store said puzzle pieces; and
    means connecting said base and said globe.

14. A puzzle as defined in claim 13 wherein said globe further comprises:
    A. iron powder or other ferromagnetic material mixed with rotationally molded plastic material.

15. The puzzle of claim 14 wherein said plastic material is a plastisol of polyvinyl chloride.

16. The puzzle of claim 14; and,:
    C. lines of latitude and longitude formed in the surface of said globe.

17. The globe puzzle and stand defined in claim 13 wherein the bottom of said base comprises ferromagnetic material.

18. The puzzle of claim 1 wherein said magnetic puzzle pieces further comprises:
    A. printed indicia of a first layer of first pieces printed on a first large sheet of magnetic material incorporating magnets, said first pieces having been cut from said first sheet, and;
    B. printed indicia of a second layer of second pieces printed on a second large sheet of the same type of magnetic material incorporating magnets and with the magnets therein aligned so as to adhere to specific portions of said first layer, said second pieces having been cut from said second sheet.

19. The puzzle of claim 1 wherein said substrate is curved and said magnetic puzzle pieces adapted to be affixed to said curved surface further comprise:
    A. printed indicia of the puzzle pieces of one layer printed on a flat layer of thermoplastic material having magnets incorporated therein heat shaped to fit said curved surface.

20. A puzzle as defined in claim 1 wherein each of said layer pieces are formed of thin flexible plastics sheet material incorporating magnets having their poles aligned on axes perpendicular to said sheets in parallel lines and said second layer pieces are designed to fit over specific portions of said first layer pieces with the parallel lines of said second layer pieces aligned such that the poles of the first and second layers are aligned to adhere to each other in a predetermined registration.

21. A puzzle as defined in claim 20 wherein said Substrate is curved; said plastic is a thermoplastic; and said pieces are the product of the process of printing indicia of the puzzle on a flat layer of said material and then heat shaping the pieces to fit said substrate.

22. In a magnetic puzzle comprising a substantially continuous ferromagnetic substrate and two or more layers of flexible plastic magnetic puzzle pieces incorporating magnets having poles oriented in lines in said layer and adapted to be magnetically affixed to said ferromagnetic substrate or to a prior layer, the improvement wherein poles of said successive layers are aligned such that pieces from successive layers can be laid over each other in predetermined positions with the poles of said second layer on top of the poles in said first layer and wherein said magnets are aligned with the north and south poles of the magnets in said layers opposite to each other.

23. The magnetic puzzle defined in claim 21 wherein said substrate is a curved surface and said pieces comprise printed indicia on flat magnetic material and said material being shaped into pieces fitting said curved surface.

* * * * *